(12) United States Patent
Koebrich et al.

(10) Patent No.: US 8,890,770 B2
(45) Date of Patent: Nov. 18, 2014

(54) MULTI-CHANNEL LED SIGN MODULE

(75) Inventors: Jeff Koebrich, Danville, IL (US); Michael Cox, Danville, IL (US); Scott Ohlmiller, Danville, IL (US); Carl Roth, St. Joseph, IL (US)

(73) Assignee: Time-O-Matic, LLC, Danville, IL (US)

( * ) Notice: Subject to any disclaimer, the term of this patent is extended or adjusted under 35 U.S.C. 154(b) by 138 days.

(21) Appl. No.: 13/587,866

(22) Filed: Aug. 16, 2012

(65) Prior Publication Data

US 2012/0319926 A1 Dec. 20, 2012

Related U.S. Application Data

(63) Continuation-in-part of application No. 13/527,621, filed on Jun. 20, 2012.

(60) Provisional application No. 61/498,713, filed on Jun. 20, 2011.

(51) Int. Cl.
*G09G 5/00* (2006.01)
*G06F 3/14* (2006.01)

(52) U.S. Cl.
CPC ............... *G09G 5/00* (2013.01); *G06F 3/1446* (2013.01); *G06F 3/1438* (2013.01); *G09G 2330/08* (2013.01); *G09G 2330/12* (2013.01); *G09G 2360/144* (2013.01); *G09G 2360/145* (2013.01)
USPC .......................................................... 345/1.3

(58) Field of Classification Search
CPC .......... G09G 2300/02; G09G 2300/23; G09G 2300/26
USPC .................. 345/1.1–1.3, 2.1–2.3, 3.1–3.4
See application file for complete search history.

(56) References Cited

U.S. PATENT DOCUMENTS

| 5,523,769 | A * | 6/1996 | Lauer et al. ..................... 345/1.3 |
| 5,619,223 | A * | 4/1997 | Lee et al. ......................... 345/93 |
| 5,914,698 | A * | 6/1999 | Nicholson et al. .............. 345/1.3 |
| 6,150,996 | A * | 11/2000 | Nicholson et al. .............. 345/1.3 |
| 6,175,342 | B1 * | 1/2001 | Nicholson et al. .............. 345/1.1 |
| 6,414,650 | B1 * | 7/2002 | Nicholson et al. .............. 345/1.1 |
| 6,697,037 | B1 * | 2/2004 | Alt et al. .......................... 345/93 |
| 6,791,513 | B2 * | 9/2004 | Ogino et al. ..................... 345/55 |
| 7,777,811 | B2 * | 8/2010 | Kondo ........................... 348/383 |
| 7,965,257 | B2 * | 6/2011 | Perkins et al. .................. 345/1.3 |
| 7,986,282 | B2 * | 7/2011 | Zerphy et al. ................... 345/1.3 |
| 8,362,970 | B2 * | 1/2013 | Perkins et al. .................. 345/1.3 |
| 2001/0030649 | A1 * | 10/2001 | Mamiya et al. ............... 345/530 |
| 2002/0190972 | A1 * | 12/2002 | Ven de Van .................... 345/204 |
| 2003/0146882 | A1 * | 8/2003 | Ogino et al. .................... 345/1.1 |

(Continued)

*Primary Examiner* — Gene W Lee
(74) *Attorney, Agent, or Firm* — Taft Stettinius & Hollister LLP; Stephen F. Rost, Esq.

(57) ABSTRACT

An electronic display includes a controller transmitting display data from a data communication port. Modules are electrically connected to each other in a series connection. Each of a first module and a last module in the series connection receives the display data directly from the controller and transmits the display data to intermediate modules in the series connection. The intermediate modules pass the display data along the series connection in a first direction until the display data is received for a second time by the last module, and in a second direction until the display data is received for a second time by the first module. Each of the modules controls activation of a respective plurality of lighting elements based on the received display data.

7 Claims, 15 Drawing Sheets

(56) References Cited

U.S. PATENT DOCUMENTS

2004/0090391 A1* 5/2004 Kondo ........................... 345/1.1
2008/0285087 A1* 11/2008 Perkins et al. ................. 358/400
2010/0164942 A1* 7/2010 Ryu ............................... 345/214
2011/0148740 A1* 6/2011 Perkins et al. ................. 345/1.3
2013/0215069 A1* 8/2013 Lee et al. ....................... 345/173

* cited by examiner

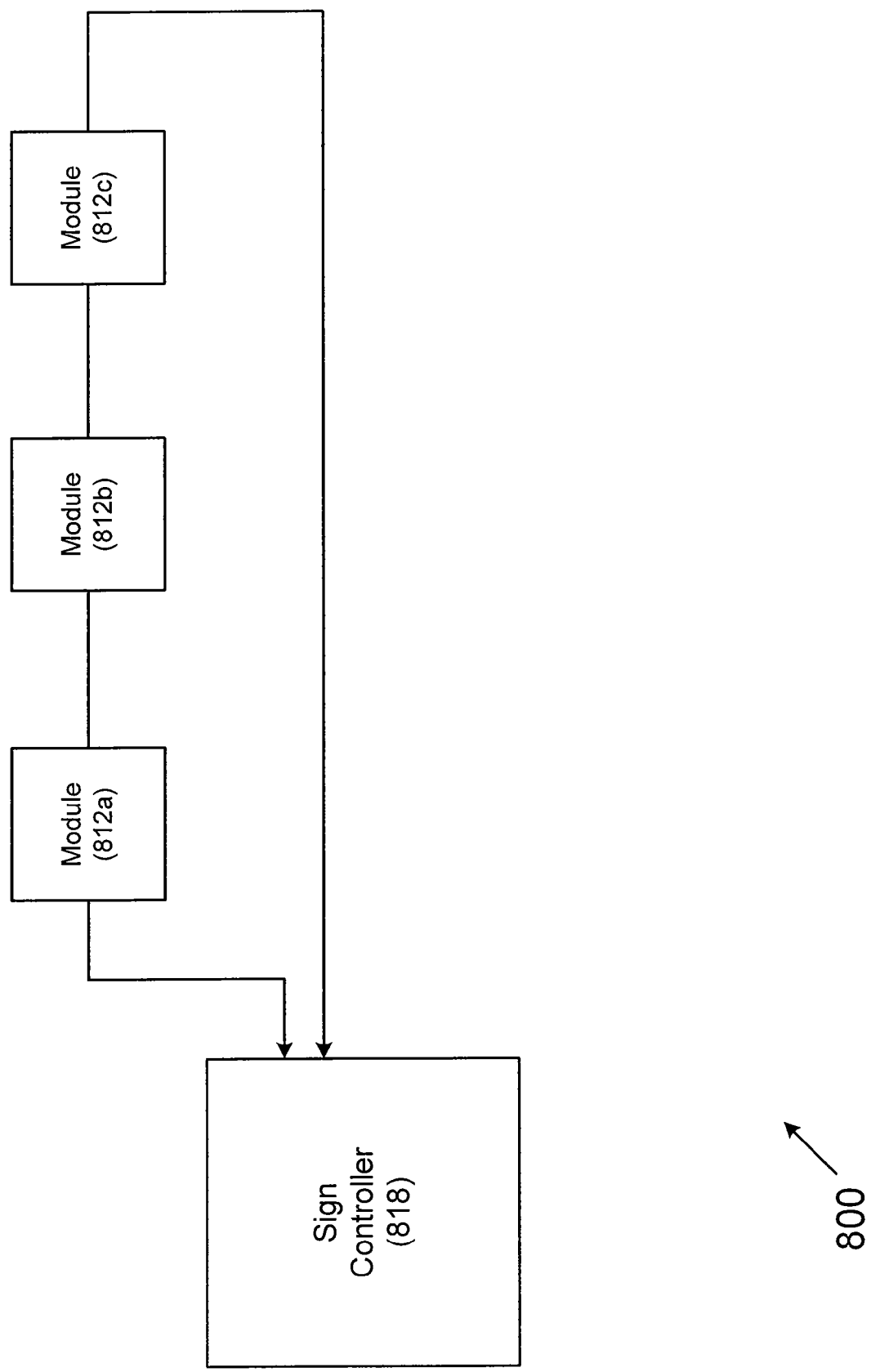

MULTI-CHANNEL LED SIGN MODULE

RELATED APPLICATION

This application is a continuation-in-part of, and claims the benefit of, nonprovisional application Ser. No. 13/527,621, filed Jun. 20, 2012, entitled "Multi-Channel LED Sign Module", by applicants Jeff Koebrich, Michael Cox, Scott Ohlmiller and Carl Roth, which is a nonprovisional of, and claims the benefit of, provisional application 61/498,713, filed Jun. 20, 2011, entitled "Multi-Channel LED Sign Module", by applicants Jeff Koebrich, Michael Cox, Scott Ohlmiller and Carl Roth, each of the above applications being hereby incorporated by reference herein in their entireties.

BACKGROUND OF THE INVENTION

1. Field of the Invention

The present invention relates to electronic displays, and methods of operating and manufacturing electronic displays.

2. Description of the Related Art

Electronic displays for displaying images are typically designed as regular arrays of light sources called picture elements, or "pixels." Each pixel emits light to reproduce a small piece of the image being displayed. For color displays, each color pixel typically includes more than one light emitter, called "sub-pixels." The color pixels usually include at least one red, one blue, and one green sub-pixel.

An electronic display signal includes the information needed for creating the image on the display. The display signal includes information corresponding to each pixel. The signal received by the pixel includes values corresponding to an amplitude of light for each of the corresponding one or more sub-pixels to generate. When a pixel includes multiple sub-pixels of different colors, the relative amplitudes of the sub-pixels determine the displayed color that is perceived by a viewer. The precise arrangement of sub-pixels, such as blue, red, and green sub-pixels, is not visible at appropriate viewing distances.

Pixels in a display are typically arranged in an array of rows and columns. Conventional pixel arrays have rows and columns of pixels arranged at right angles, also known as an "orthogonal" pixel array. FIG. 1 shows an orthogonal pixel array 100, with pixels 150 arranged in orthogonal rows 111 and columns 112. While, for purposes of explanation, the pixel display 100 shows only six rows and six columns of pixels, it should be understood that a typical orthogonal pixel array may include hundreds or thousands of rows and columns.

Types of light emitters used in pixels known in the art include light-emitting-diodes (LED's). For example, the sub-pixels of one type of LED pixel may include one red, one green, and one blue LED. Other commonly known types of light emitters used in pixels include plasma, liquid crystal display (LCD), and cathode ray tube (for small displays), to name but a few.

Pixel arrays having LED pixels may be constructed using either "through-hole" or "surface-mount" type devices, as are known in the art. Through-hole devices, on the one hand, include discrete LED sub-pixels or discrete LED pixels which are mounted individually on a circuit board by fitting wire leads of the discrete elements into holes in the circuit board. Surface-mount devices, on the other hand, are mounted directly onto the surface of, and electrically connected to, a circuit board having wiring already printed on its surface to correspond to the wiring of the surface-mount devices.

Pixel array 100 and their associated circuit boards, if any, may be divided into sub-arrays each supported by a respective one of modules 12a-c, 14a-c and 16a-c. Each module may provide its respective sub-array of pixels with a supporting mechanical frame (not shown) and individual electronic control. Thus, dividing the pixels into modules may provide the advantages of improving the mechanical integrity and modularity of the electronic display such that the display is easier to build and maintain. For ease of illustration, each of modules 12a-c, 14a-c and 16a-c is shown as supporting a sub-array of only two rows and two columns of pixels. However, it is to be understood that each module may support tens or hundreds of rows and columns. Similarly, for ease of illustration, only three rows and three columns of modules are shown. However, it should be understood that a typical electronic display may include tens or hundreds of rows and columns of modules.

As shown in the electronic display arrangement 10 of FIG. 2, the modules in each row of modules may be connected sequentially in series to a sign controller 18. Sign controller 18 may provide display data (e.g., specify whether each lighting element should be ON or OFF, and specify the color and brightness of each lighting element when ON) to each module through the series connections. That is, the display data flows from left to right from sign controller 18 to each of modules 12a-c in sequence; from sign controller 18 to each of modules 14a-c in sequence; and from sign controller 18 to each of modules 16a-c in sequence. A problem, however, is that if one of the modules malfunctions, then the malfunctioning module may be unable to pass data to the other modules that are downstream from the malfunctioning module. For example, if module 12a malfunctions, then modules 12b-c may not receive their display data, and the entire row of modules may not display properly. With long series connections, it may be particularly visually noticeable if a large number of horizontally adjacent modules are not displaying properly.

What is neither disclosed nor suggested in the conventional art is an electronic display in which the failure of one module does not affect the performance of other modules in the display.

SUMMARY OF THE INVENTION

The invention is directed to an electronic display arrangement in which each module may receive display data from either of two directions. Thus, if a given module can no longer receive display data from one direction due to the failure of an upstream module, conductor or connection, then the given module may still be able to receive display data from the other direction.

The modules may function as independent display elements. A controller in the electronic sign may process messages which were previously loaded by a user and transmit the display information to the modules over a local area network (LAN) which may be driven by elements of the control system. The modules may be capable of self-addressing and performing in a diagnostics mode. In a multi-channel operation mode, in the event of a failed module, the remaining modules may be able to recover and continue to operate.

Each module in the electronic display may be connected to other modules in the electronic display over a local area network through one or more data channels. Each module may be able to block data from neighboring modules from reaching the network to aid in self-addressing and diagnostic feedback. When a module senses a failure in the data input from a channel (e.g., silence for more than thirty seconds), then the module may switch to listening to another channel, and the module may reconfigure the direction of the data blocking so that diagnostics may continue to function.

In one embodiment, the invention comprises an electronic display arrangement including a controller having at least one data communication port. The controller transmits display data from the at least one data communication port. A plurality of modules are electrically connected to each other in a series connection. Each of the modules includes at least one data communication port. A first one of the modules is on a first end of the series connection. The at least one communication port of the first module is electrically connected to the at least one communication port of the controller. A last one of the modules is on a second end of the series connection. The at least one communication port of the last module is electrically connected to the at least one communication port of the controller. The first module receives the display data from the controller and transmits the display data to at least one intermediate module in the series connection. The at least one intermediate module passes the display data along the series connection in a first direction until the display data is received by the last module. Each of the modules controls activation of a respective plurality of lighting elements based on the received display data. The last module transmits to the controller an acknowledgement of receipt of the display data. If the controller does not receive the acknowledgement from the last module after transmitting the display data, then the controller transmits the display data directly to the last module. The last module receives the display data directly from the controller and transmits the display data to the at least one intermediate module in the series connection. The at least one intermediate module passes the display data along the series connection in a second direction opposite to the first direction.

In another embodiment, the invention comprises a method of operating an electronic display including providing a plurality of modules electrically connected to each other in a series connection, electrically connecting a first one of the modules and a last one of the modules to a controller, and electrically connecting the first module to the last module via at least one intermediate one of the modules. Display data is transmitted from a controller to the first module, and the first module transmits the display data to the at least one intermediate module. The at least one intermediate module passes the display data along the series connection in a first direction until the display data is received by the last module. Each of the modules controls activation of a respective plurality of lighting elements dependent upon the received display data. The last module transmits to the controller an acknowledgement of receipt of the display data. If the controller does not receive the acknowledgement from the last module after transmitting subsequent display data, then the controller transmits the subsequent display data to the last module, the last module transmits the subsequent display data to the at least one intermediate module, and the at least one intermediate module passes the subsequent display data along the series connection in a second direction opposite to the first direction.

In yet another embodiment, the invention comprises a method of operating an electronic display including providing a plurality of modules electrically connected to each other in a series connection. A first one and a last one of the modules are each electrically connected to a controller. The first module is electrically connected to the last module via at least one intermediate one of the modules. An addressing session is performed including transmitting a first address to the first module, inhibiting the first module from re-transmitting the first address, transmitting a second address to the first module, re-transmitting the second address from the first module to one intermediate module, inhibiting the one intermediate module from re-transmitting the second address, transmitting a third address to the first module, re-transmitting the third address from the first module to the one intermediate module, and passing the third address along to the last module. After the addressing session, an operating session is performed including transmitting display data from the controller to the first module. The display data includes identifications of associations between respective portions of the display data and the first address, second address and third address. The last module is used to transmit to the controller an acknowledgement of receipt of the display data. If the controller does not receive the acknowledgement from the last module after transmitting subsequent display data to the first module, then the controller is used to transmit the subsequent display data to the last module.

In still another embodiment, the invention comprises an electronic display including a controller transmitting display data from a data communication port. Modules are electrically connected to each other in a series connection. Each of a first module and a last module in the series connection receives the display data directly from the controller and transmits the display data to intermediate modules in the series connection. The intermediate modules pass the display data along the series connection in a first direction until the display data is received for a second time by the last module, and in a second direction until the display data is received for a second time by the first module. Each of the modules controls activation of a respective plurality of lighting elements based on the received display data.

In another embodiment, the invention comprises a method of operating an electronic display including providing a plurality of modules electrically connected to each other in a network such that each module is at least indirectly connected to each other one of the modules, and at least one of the modules is directly connected to at least four other ones of the modules. A first one of the modules and a second one of the modules are each directly electrically connected to a controller. Display data is transmitted from the controller to each of the first module and the second module. The display data is transmitted from the first module and from the second module to every other one of the modules via the network. Each of the modules is used to control activation of a respective plurality of lighting elements dependent upon the received display data.

In yet another embodiment, the invention comprises a method of operating an electronic display, including providing a plurality of modules electrically connected to each other in a network such that each module is at least indirectly connected to each other one of the modules, and at least one of the modules is directly connected to at least three other ones of the modules. A first one of the modules and a second one of the modules are each directly electrically connected to a controller. Display data is transmitted from the controller to each of the first module and the second module. The display data is transmitted from the first module and from the second module to every other one of the modules via the network. Each of the modules is used to control activation of a respective plurality of lighting elements dependent upon the received display data. Diagnostic information is transmitted from one of the modules to each other module that the module is directly connected to. The diagnostic information is transmitted from each of the other modules that received the diagnostic information to the controller.

An advantage of the invention is that the failure or malfunction of a module, electrical conductor or connection in the electronic display does not adversely affect modules that are downstream from the malfunctioning module, electrical conductor or connection.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein:

FIG. 4 is a schematic diagram of an example module of the electronic display arrangement of FIG. 3a.

FIG. 8c is a block diagram of the sign controller and module connections of the electronic display arrangement of FIG. 8a illustrating the flow of error signals with one of the modules malfunctioning.

Figure 1:
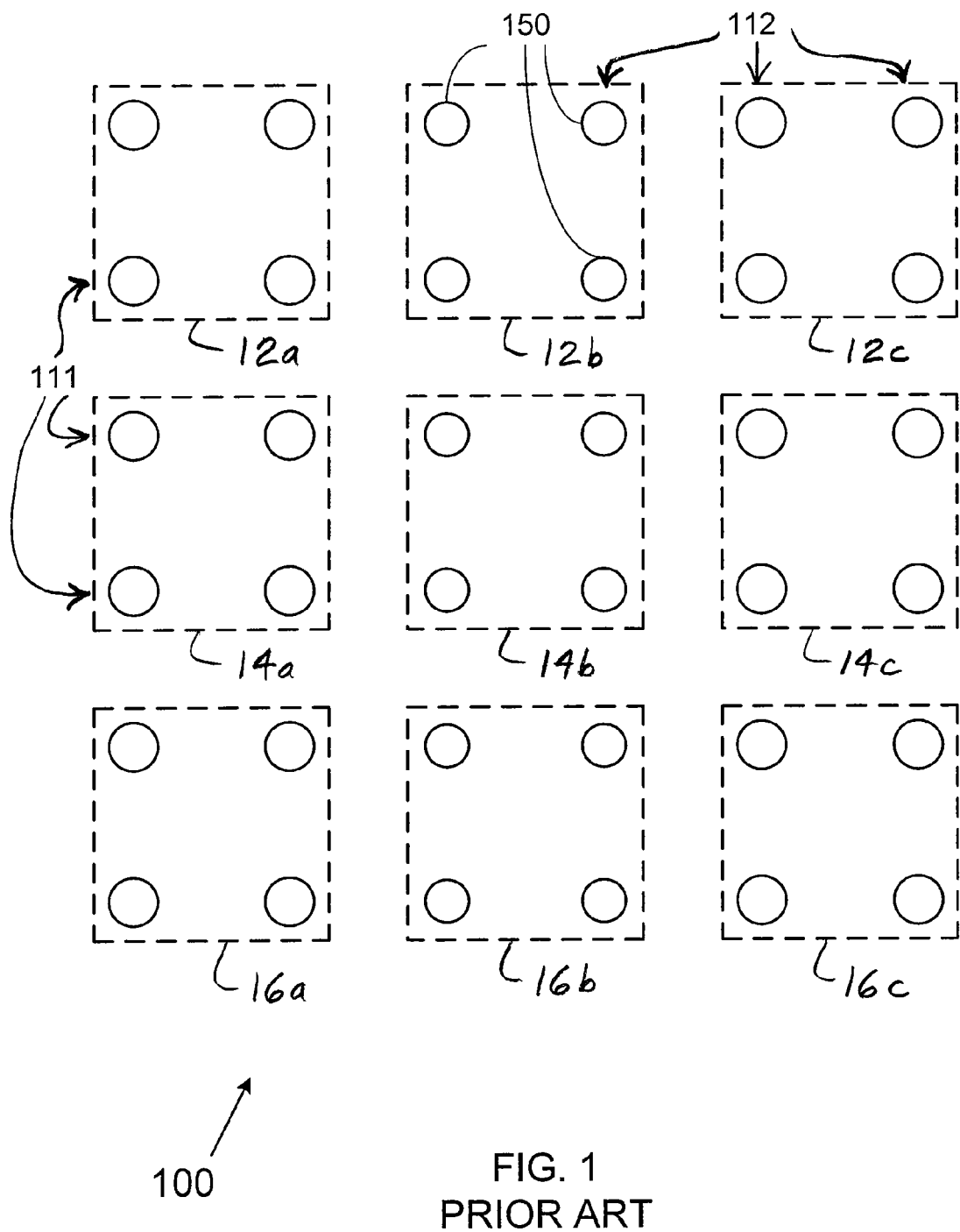
FIG. 1 is a schematic view of an orthogonal pixel array of a prior art electronic display.
Figure 2:
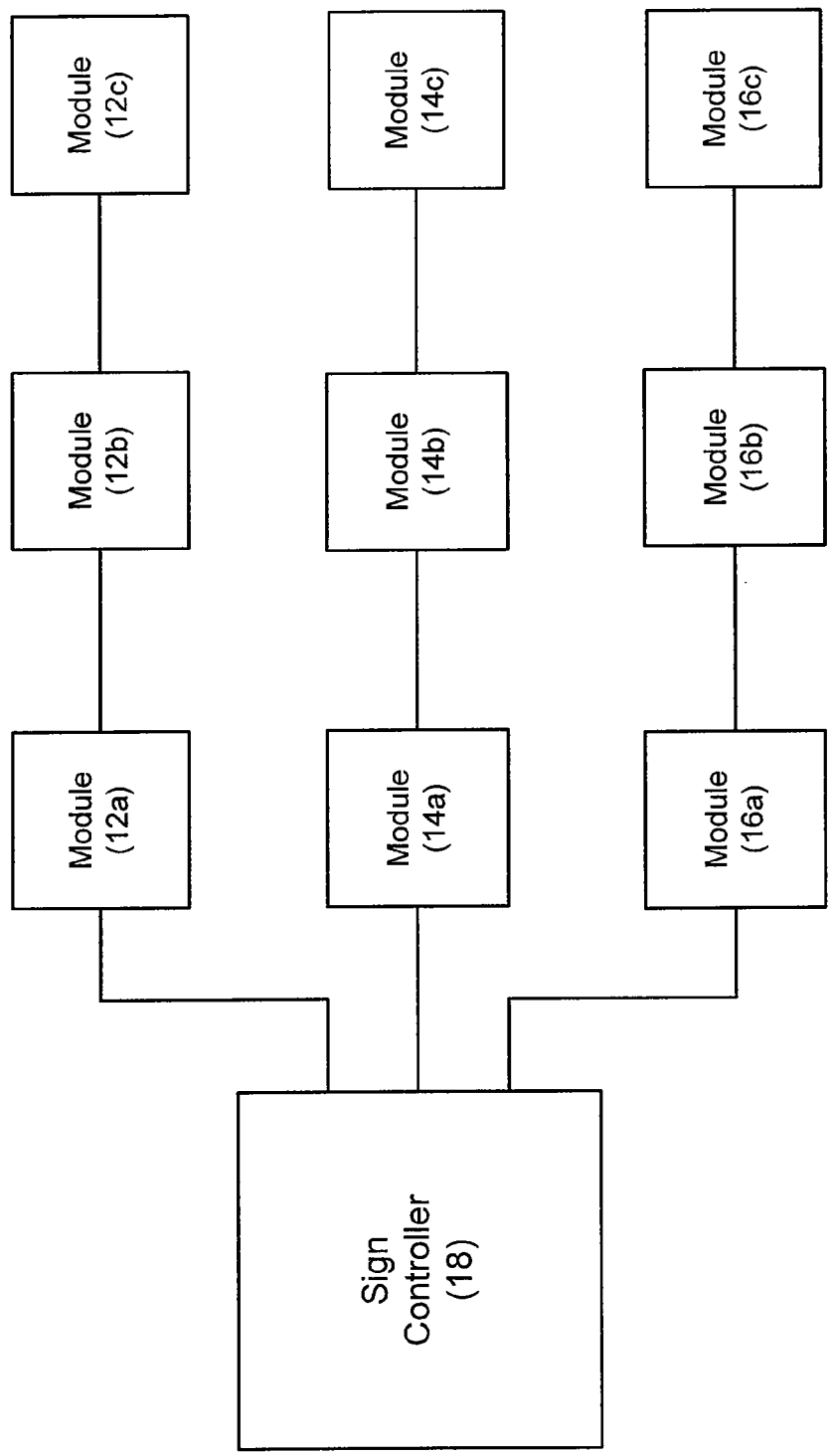
FIG. 2 is a block diagram of a sign controller and module connections of a prior art electronic display.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DESCRIPTION OF THE PRESENT INVENTION

Figure 3A:
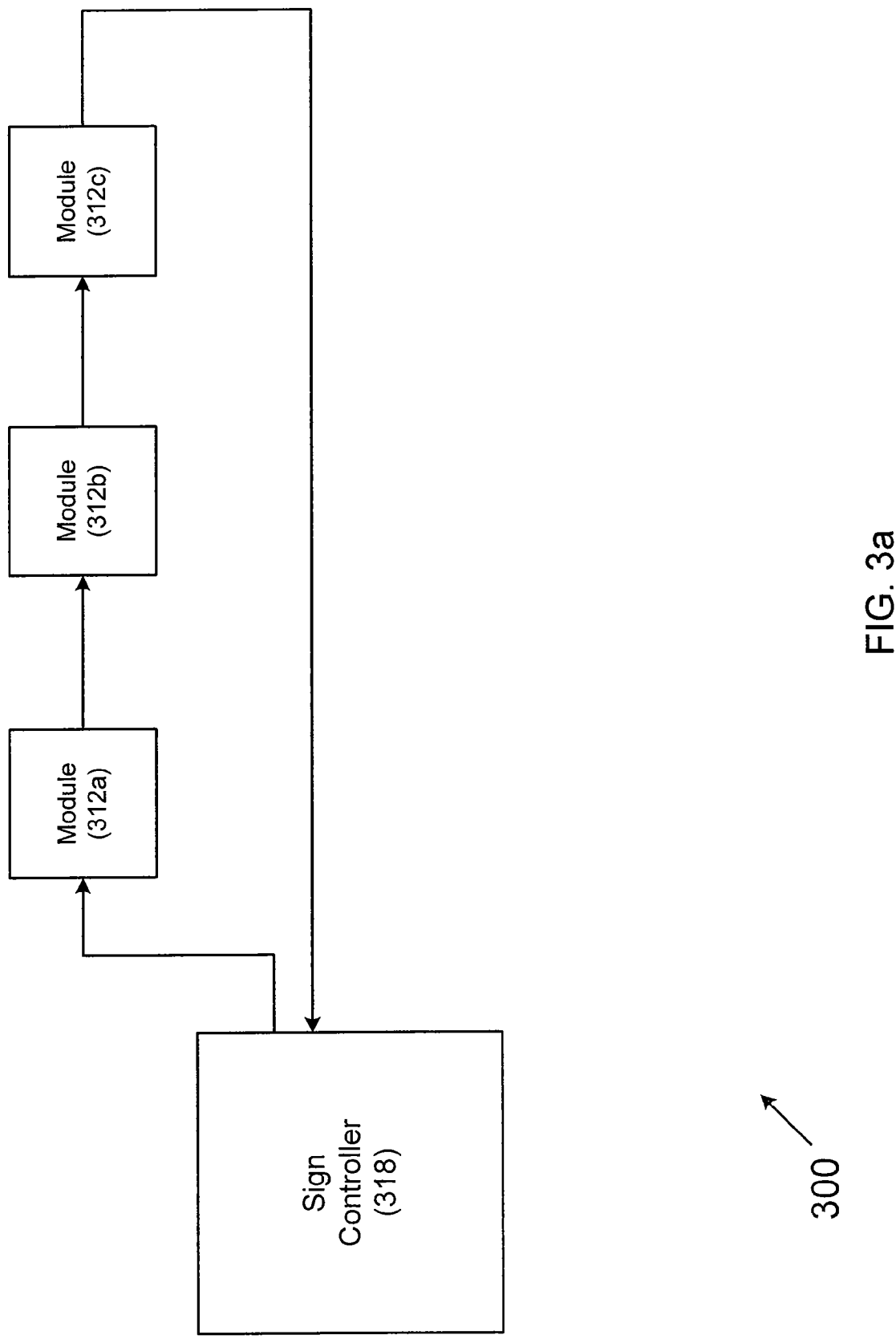
FIG. 3a is a block diagram of a sign controller and module connections of one embodiment of an electronic display arrangement of the present invention illustrating the flow of display data with all modules functioning properly.

Referring to FIG. 3a, there is illustrated one embodiment of an electronic display arrangement 300 of the present invention including a sign controller 318 and three modules 312a-c all connected together in a series loop. The series loop may be in the form of a local area network (LAN), for example. One channel enters each module from the left, and another channel enters each module from the right. Data may flow in either direction.

Controller 318 may be in the form of a central processing unit (CPU). Controller 318 may receive the display data (e.g., messages, schedules and playlist information) over one of several possible communications paths from a host computer that runs a proprietary program to generate the display data. A message may contain graphical, text, and background information as well as instructions to the sign controller regarding special appear and hold effects and timing information. The information in the message may be compressed or compacted in order to minimize storage space and to enable faster transmission to the sign controller. In order to play a message on the sign, the controller may parse the information in the message to generate a sequence of frames. A resolved bitmap may be divided into data packets that correspond to the respective portions of the electronic sign occupied by each module. Controller 318 may communicate to modules 312a-c over a local area network using a serial asynchronous data protocol.

Controller 318 may transmit to module 312a the display data for each of the three modules 312a-c. Module 312a may then read only the portion of the display data that is addressed to module 312a. That is, module 312a may read only the portion of the display data that is assigned to an address matching the address of module 312a.

Module 312a may then transmit to module 312b the display data for each of the three modules 312a-c. Module 312b may then read only the portion of the display data that is addressed to module 312b. That is, module 312b may read only the portion of the display data that is assigned to an address matching the address of module 312b.

Module 312b may then transmit to module 312c the display data for each of the three modules 312a-c. Module 312c may then read only the portion of the display data that is addressed to module 312c. That is, module 312c may read only the portion of the display data that is assigned to an address matching the address of module 312c.

Module 312c may transmit the display data for each of the three modules 312a-c back to controller 318. Controller 318 may then treat the receipt of the display data for each of the three modules 312a-c as an acknowledgement that each of the three modules 312a-c also received the display data for each of the three modules 312a-c. However, in another embodiment, instead of transmitting the display data for each of the three modules 312a-c, module 312c transmits only a short acknowledgement signal to controller 318 for the sake of efficiency.

Figure 3B:
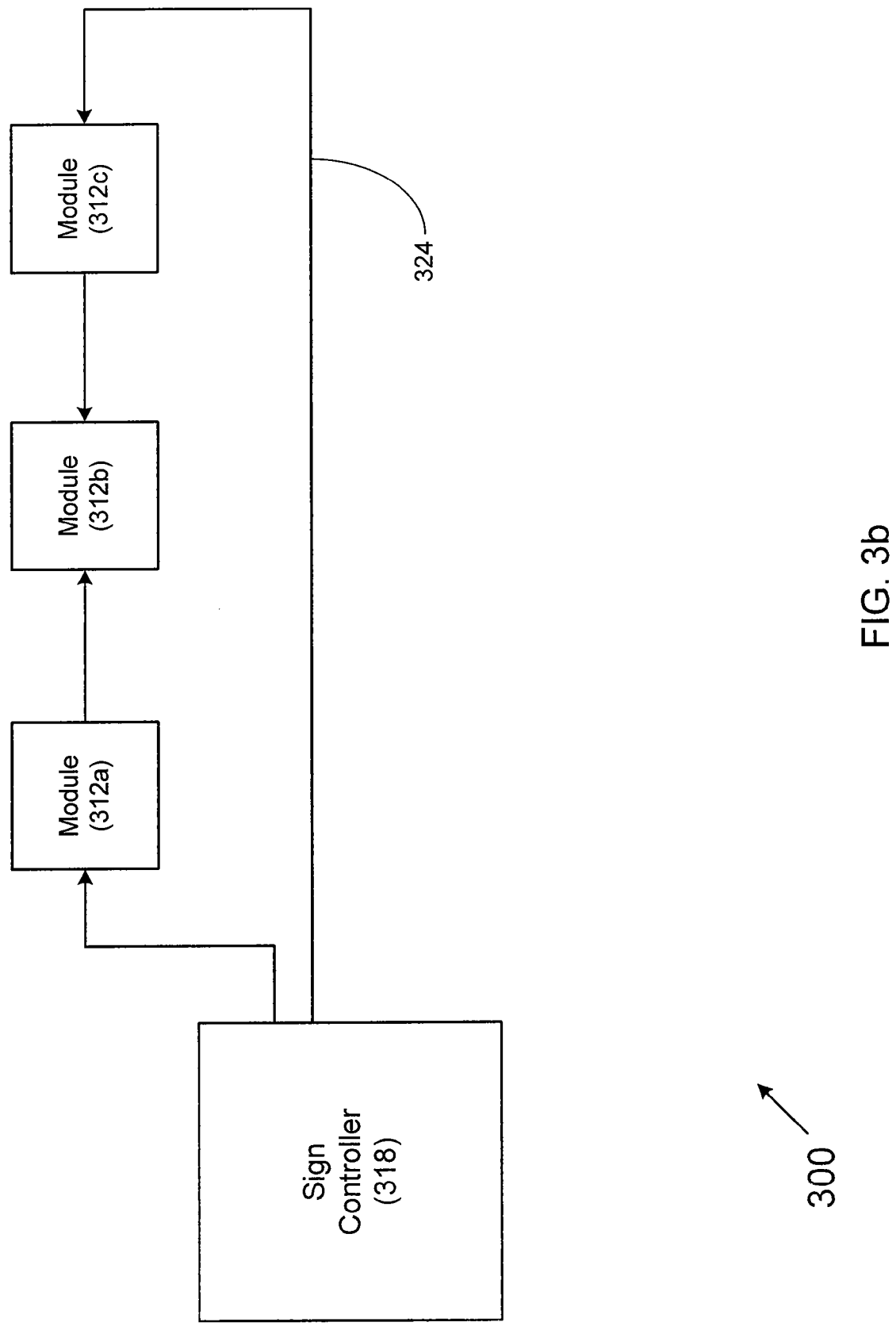
FIG. 3b is a block diagram of the sign controller and module connections of the electronic display arrangement of FIG. 3a illustrating the flow of display data in one embodiment with one of the modules malfunctioning.

In the event that one of modules 312a-c malfunctions and is unable to transmit display data, the flow of the display data may be reconfigured such that each of modules 312a-c may still receive the display data. For the specific example of a malfunction in module 312b, FIG. 3b illustrates the reconfigured flow of display data such that each of modules 312a-c still receives the display data. More particularly, if sign controller 318 does not receive the display data or an acknowledgement signal from module 312c within a predetermined length of time after transmitting the display data to module 312a, then sign controller 318 may assume that one of modules 312a-c has malfunctioned and is no longer capable of transmitting the display data. In that event, sign controller 318 may re-transmit the display data to module 312c, as indicated by arrow 324. Sign controller 318 may re-transmit the display data on a same communication port on which sign controller 318 received the display data in FIG. 3a. Alternatively, sign controller 318 may re-transmit the display data on a communication port that is different from the communication port on which sign controller 318 received the display data in FIG. 3a.

Figure 3C:
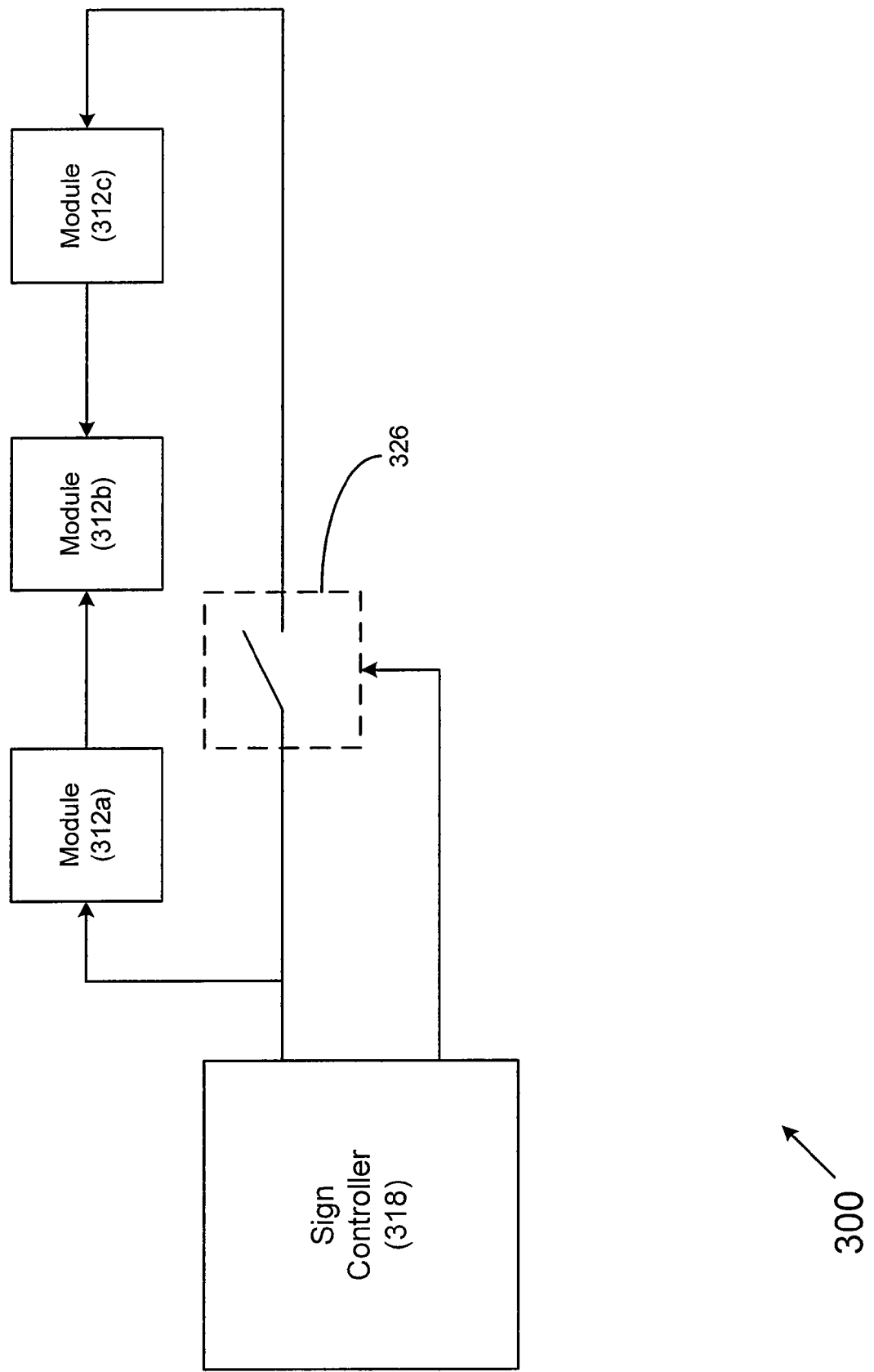
FIG. 3c is a block diagram of the sign controller and module connections of the electronic display arrangement illustrating the flow of display data in another embodiment with one of the modules malfunctioning.

As another alternative, shown in FIG. 3c, module 312c may receive the display data from the same communication port of sign controller 318 that first transmitted the display data to module 312a. More specifically, if sign controller 318 does not receive the display data or an acknowledgement signal from module 312c within a predetermined length of time after transmitting the display data to module 312a, then sign controller 318 may close a switch 326 (shown open in FIG. 3c) to thereby directly connects the display data output port of sign controller 318 with a display data input port of module 312c.

In the embodiments of FIGS. 3b-c, module 312c may receive the display data from controller 318 on a same communication port on which module 312c transmitted the display data in FIG. 3a. Alternatively, module 312c may receive the display data from controller 318 on a communication port that is different from the communication port on which module 312c transmitted the display data in FIG. 3a. Similarly, in the embodiments of FIGS. 3b-c, module 312c may transmit the display data to module 312b on a same communication port on which module 312c received the display data in FIG. 3a. Alternatively, module 312c may transmit the display data to module 312b on a communication port that is different from the communication port on which module 312c received the display data in FIG. 3a.

As illustrated by FIGS. 3b-c, module 312c receives the display data directly from sign controller 318 in the event that module 312b malfunctions. Further, module 312c re-transmits the display data in the counterclockwise direction relative to FIGS. 3b-c such that module 312b also receives the display data from module 312c. It is to be understood that if there are additional modules between the malfunctioning module 312b and module 312c, then each of such in-between modules also receive and re-transmit the display data in the counterclockwise direction along the series loop, thereby passing the display data along until module 312b finally receives the display data and can pass it along no farther.

As described above, normally the modules are all "listening" to the data from one channel or port. In the event that a module malfunctions, the other downstream modules that cease receiving display data may start looking for data from another channel and resume displaying as before the malfunction. Thus, possibly only the malfunctioning module and its associated light emitting elements remain blank. After the malfunctioning module is replaced, the default data transmission scheme illustrated in FIG. 3a may be restored.

Figure 4:
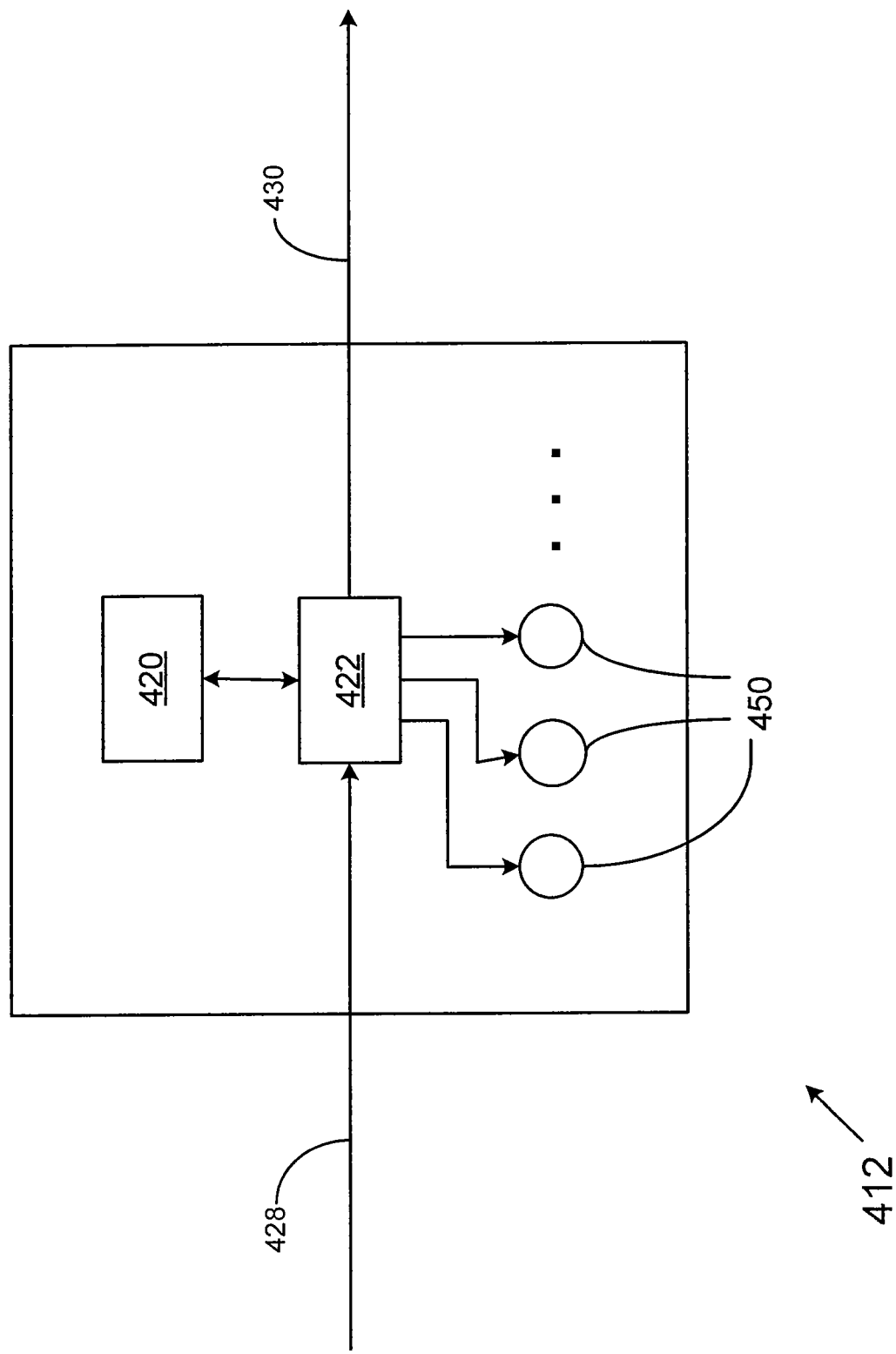

FIG. 4 illustrates a specific example embodiment of a module 412 that may be suitable for use in the embodiments of the invention. Module 412 includes a processor, microcontroller, or field-programmable gate array (FPGA) 422 that is capable of both receiving display data, as indicated by arrow 428, and transmitting display data, as indicated by arrow 430. Processor 422 may include an integrated communications device (not shown) to receive data from the sign controller from one or more data channels. The device may be connected to a local area network which is also connected to the other modules. Thus, all modules may "hear" the same data, except perhaps in a self-addressing mode as described below.

Each module may have a unique address which enables its processor to determine its virtual position along a sequential chain of the modules. From that virtual position information, the processor may determine its physical location within the electronic display. After determining its physical address, a processor of a module may respond only to all data and command packets that match its physical address. Each packet may contain a unique address matching the address of the module that is supposed to play the packet. However, the packets may be normally sent to and received by all the modules.

Sign controller 318 may include a test/operate switch (not shown) which may be used to display special test patterns on the electronic display and to initiate an addressing session. Modules 312a-c may represent one of several rows of modules, with each row receiving a unique set of display data from controller 318. Each module may be able to control whether it passes the data along the series connection or not (e.g., whether the module passes the data to the right in FIG. 3a). In normal operation, all data may be passed from the left to the right through all the modules. However, in a special addressing session, all modules may be commanded to turn off their re-transmission so only the most upstream module connected to the sign controller in each row can "hear" the data. Each of these most upstream modules may be supplied with an address and may be commanded to turn on its re-transmission of data in the downstream direction. Then the second most upstream module in each row may be supplied with an address and may be commanded to turn on its re-transmission of data in the downstream direction. This process may be repeated until each module in each row has received its unique address. The unique address may be stored in the non-volatile memory in each module. In the event that a module is replaced or moved to another location on the electronic display, then the addressing session may be repeated.

In a diagnostic mode of operation, each module may transmit diagnostic information about itself back to the sign controller over the same channel that is used to receive data. The diagnostic mode may be initiated by the sign controller. The direction in which the diagnostic data flows may be dependent upon which channel the module is actively listening to. The diagnostic information may include a status of the module, a status of a part of the module, a failure mode of the module, an identity of another module that failed to transmit display data to the module, and/or a direction from which the module did not receive display data.

Module 412 also includes a light detector 420 that may be in bi-directional communication with processor 422. In one embodiment, light detector 420 senses a level of ambient light and communicates the level of ambient light to processor 422 so that processor 422 may control the level of light emission by light emitting elements 450 accordingly. For example, if light detector 420 senses a high level of ambient light, such as due to sunlight around noontime, then processor 422 may cause lighting elements 450 to emit a relatively high level of light so that the light from lighting elements 450 may be more easily seen by viewers in the sunlight. Conversely, if light detector 420 senses a low level of ambient light, such as at night, then processor 422 may cause lighting elements 450 to emit a relatively low level of light in order to use less power, extend the life of lighting elements 450, and/or prevent lighting elements 450 from blinding onlookers.

The display data received from the sign controller may be used by the processor of the modules to determine the desired color and brightness level for all light emitting elements within the module. As described above, feedback from light detectors 420 may be used to achieve the desired color and brightness levels. New or updated display data may be provided to the light emitting elements as frequently as sixty times per second. However, it is also possible for the display data to be permanent or semi-permanent, remaining constant for minutes or hours at a time.

Figure 5:
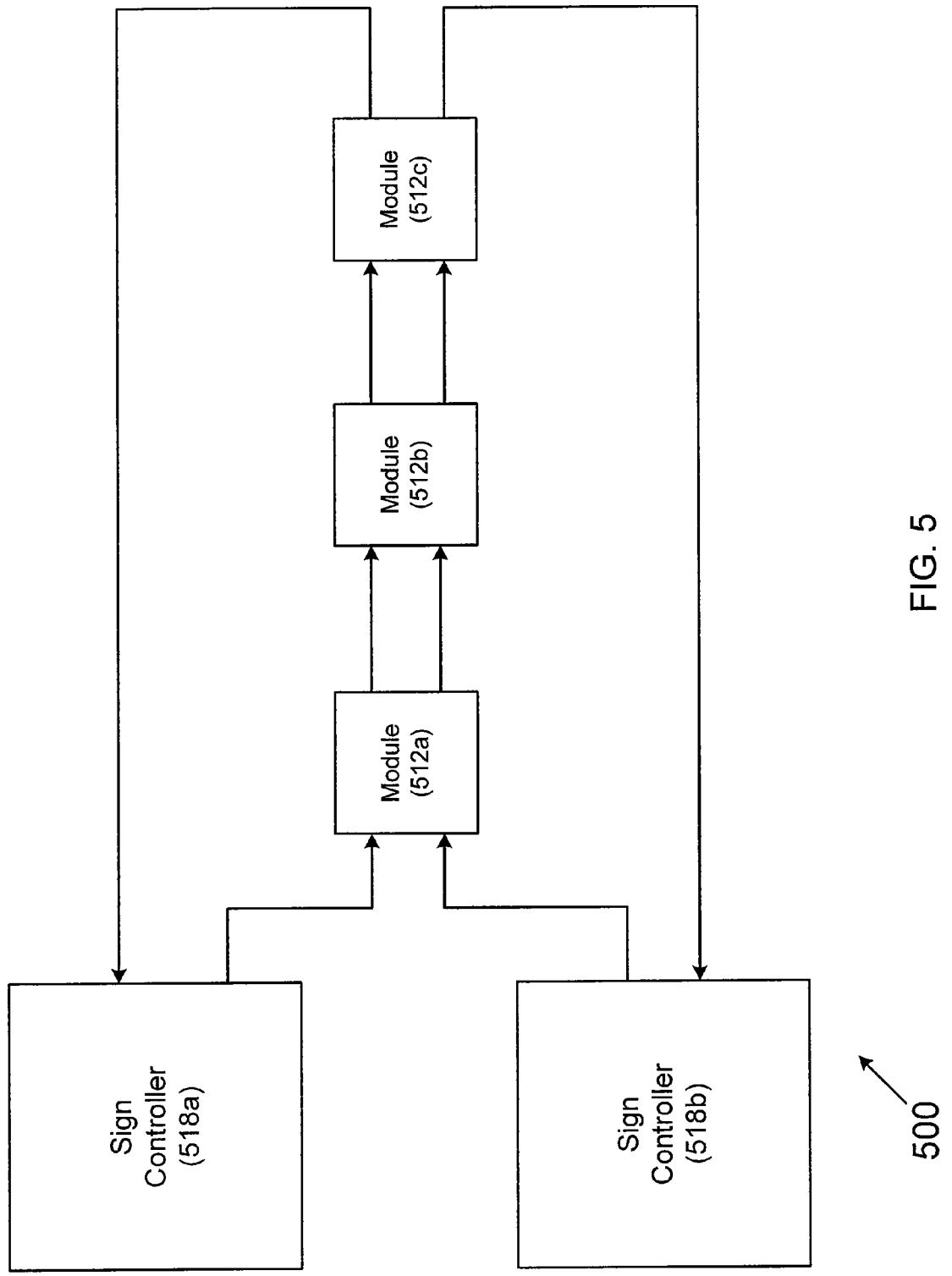
FIG. 5 is a block diagram of a sign controller and module connections of another embodiment of an electronic display arrangement of the present invention.

Another embodiment of an electronic display arrangement 500 of the invention illustrated in FIG. 5 is substantially similar to electronic display arrangement 300 with the exception that arrangement 500 includes two sign controllers 518a-b which each transmit display data to modules 512a-c. Two channels enter each module from the left, and another two channels enter each module from the right. Data may flow in either direction. Each of sign controllers 518a-b may provide display data for a respective portion of the lighting elements of each of modules 512a-c. Alternatively, each of sign controllers 518a-b may provide display data for all of the lighting elements of modules 512a-c, but sign controllers 518a-b may provide the display data at different times. For example, each of sign controllers 518a-b may provide separate sets of display data which may correspond to different electronic advertisements that are to be displayed at different times.

FIG. 5 illustrates the flow of display data when each of modules 512a-c is properly operating, which is substantially similar to the flow of display data described above with regard to FIG. 3a. However, if any of modules 512a-c malfunctions such that it is unable to transmit the display data that it has received, then sign controllers 518a-b each transmit the display data in two opposite directions around their respective communication loop such that each of the modules in the loop receive the display direction from one direction or the other. This reconfiguration of the flow of display data for each of the sign controllers 518a-b may be substantially similar to that described above with regard to FIG. 3b.

Figure 6:
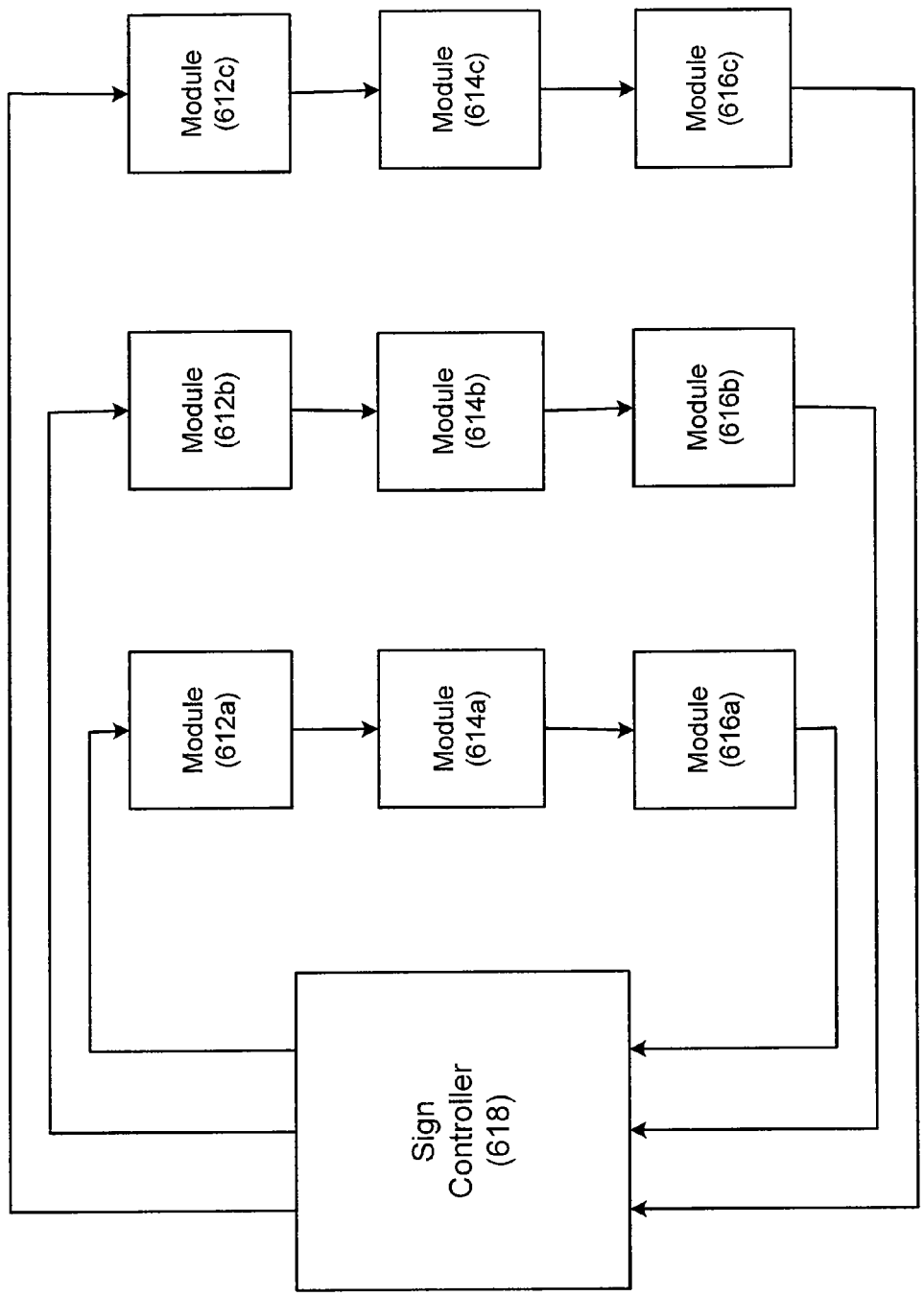
FIG. 6 is a block diagram of a sign controller and module connections of yet another embodiment of an electronic display arrangement of the present invention.

In the embodiments described above, the flow of display data may be in a horizontal direction across the electronic display from module to module. However, in another embodiment of an electronic display arrangement 600 illustrated in FIG. 6, the flow of display data may be in a vertical direction down the electronic display from module to module. That is, the channels may enter the modules from above and from below. Moreover, a single sign controller 618 provides display data for multiple loops of modules. Specifically, sign controller 618 provides display data for a first loop including modules 612a, 614a and 616a; for a second loop including modules 612b, 614b and 616b; and for a third loop including modules 612c, 614c and 616c. Other features of arrangement 600 may be substantially similar to the features of other embodiments described above, and are not described specifically in association with arrangement 600 in order to avoid needless repetition.

Figure 7A:
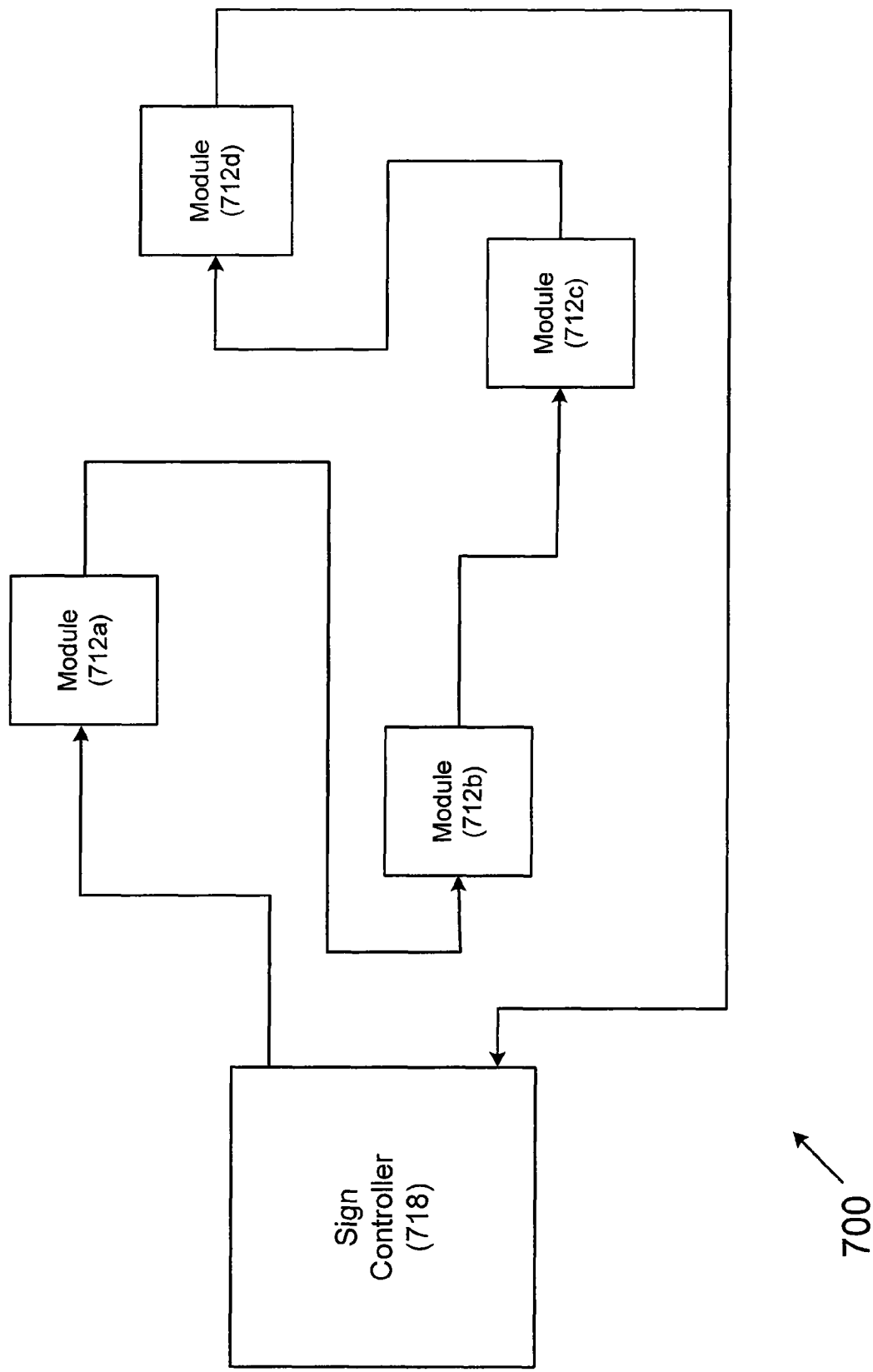
FIG. 7a is a block diagram of a sign controller and module connections of still another embodiment of an electronic display arrangement of the present invention illustrating the flow of display data with all modules functioning properly.

In the embodiments described above, the flow of display data may be either in a horizontal direction across the electronic display or in a vertical direction up and/or down the electronic display from module to module. However, it is to be understood that the present invention is not limited to any particular pattern or direction of data flow through the modules, and the modules may be arranged in any random order. For example, in another embodiment of an electronic display arrangement 700 illustrated in FIG. 7a, the flow of display data may zig-zag in a serpentine path from module to module across the electronic display in a variety of directions having components that are leftward, rightward, upward and/or downward.

Figure 7B:
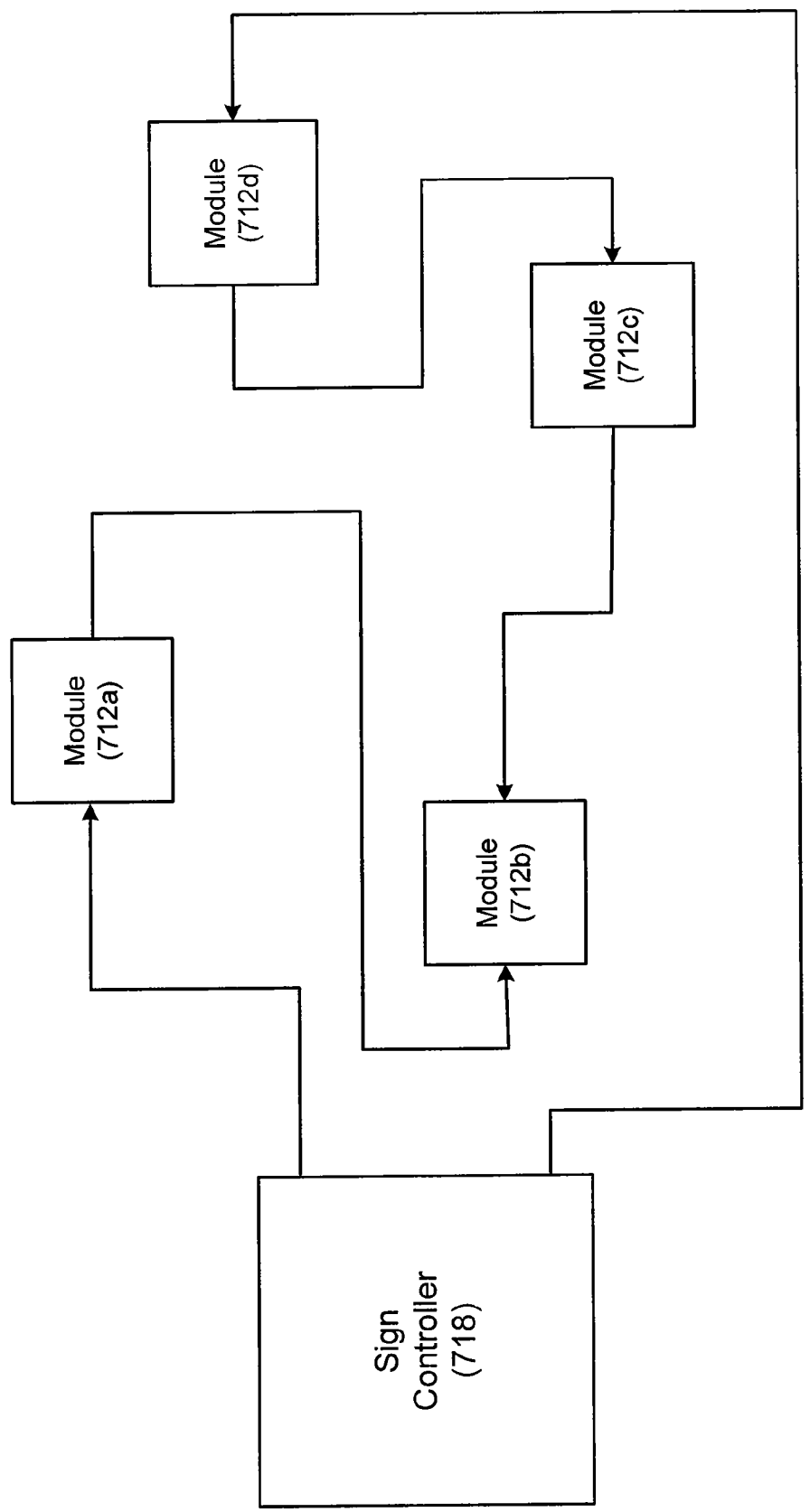
FIG. 7b is a block diagram of the sign controller and module connections of the electronic display arrangement of FIG. 7a illustrating the flow of display data with one of the modules malfunctioning.

The reconfigured flow of display data in arrangement 700 in the event of a failure of module 712b is illustrated in FIG. 7b. Similarly to the embodiment described above with regard to FIG. 3b, if sign controller 718 does not receive back the display data that sign controller 718 previously transmitted, or receive some other type of acknowledgement that module 712d received the display data, then sign controller 718 re-transmits the display data into the loop in a generally counterclockwise direction opposite to the generally clockwise direction in which the display data was originally transmitted. Thus, module 712d is the first recipient of the re-transmitted display data. Module 712d reads the portion of the display data that is addressed to module 712d and then re-transmits all of the display data to module 712c. Module 712c, in turn, reads the portion of the display data that is addressed to module 712c and then re-transmits all of the display data to module 712b. Because module 712b is malfunctioning, it is unable to re-transmit the display data to module 712a. However, module 712a received the display data in the original transmission from sign controller 718. Accordingly, each of modules 712a-d receives the display data from either the original generally clockwise direction or from the subsequent generally counterclockwise direction even though one of the modules is unable to re-transmit the display data that it receives.

Although the communication ports of the sign controller and modules of arrangements 500, 600 and 700 are not described in detail herein, it is to be understood that they may also include all of the various alternative configurations and hardware discussed above with regard to arrangement 300.

Figure 8A:
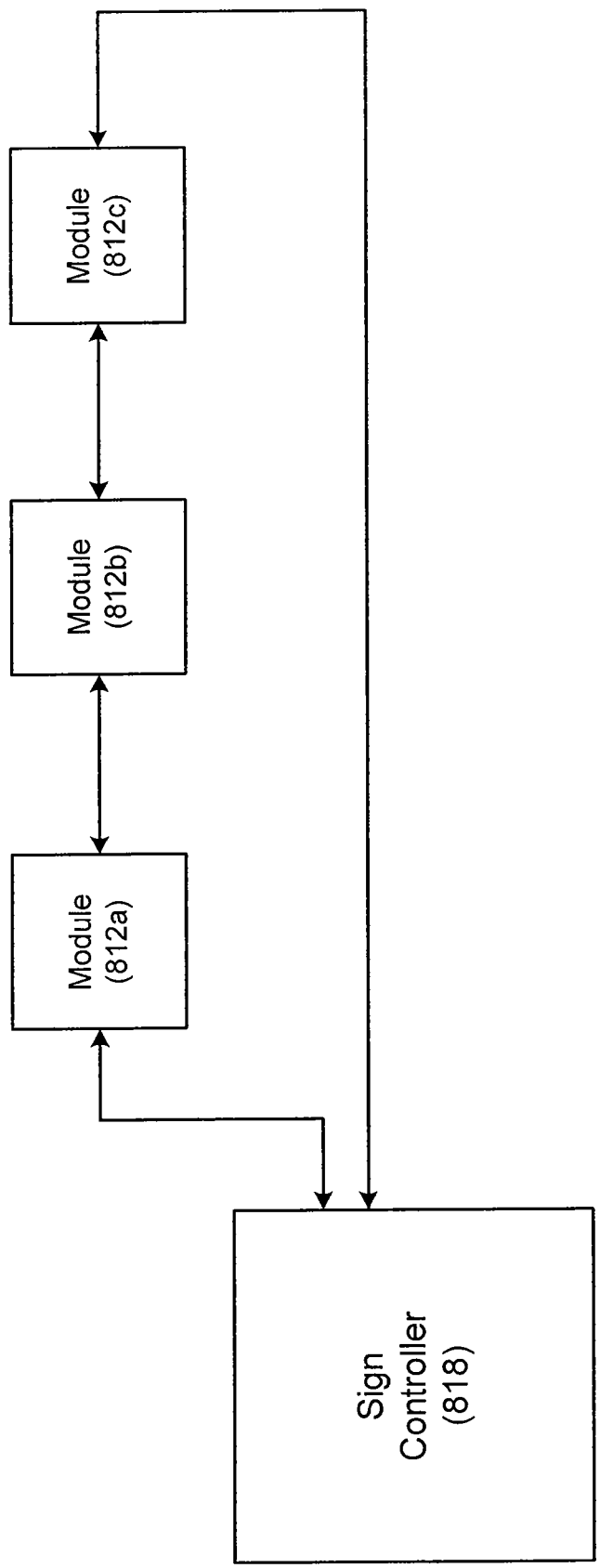
FIG. 8a is a block diagram of a sign controller and module connections of another embodiment of an electronic display arrangement of the present invention illustrating the flow of display data with all modules functioning properly.

Referring to FIG. 8a, there is illustrated another embodiment of an electronic display arrangement 800 of the present invention including a sign controller 818 and three modules 812a-c all connected together in a series loop. The series loop may be in the form of a local area network (LAN), for example. One channel enters each module from the left, and another channel enters each module from the right. Data may flow in both directions, i.e., both in a clockwise direction through the series loop and in a counterclockwise direction through the series loop.

Controller 818 may be in the form of a central processing unit (CPU). Controller 818 may receive the display data (e.g., messages, schedules and playlist information) over one of several possible communications paths from a host computer that runs a proprietary program to generate the display data. A message may contain graphical, text, and background information as well as instructions to the sign controller regarding special appear and hold effects and timing information. The information in the message may be compressed or compacted in order to minimize storage space and to enable faster transmission to the sign controller. In order to play a message on the sign, the controller may parse the information in the message to generate a sequence of frames. A resolved bitmap may be divided into data packets that correspond to the respective portions of the electronic sign occupied by each module. Controller 818 may communicate to modules 812a-c over a local area network using a serial asynchronous data protocol.

Controller 818 may transmit to each of modules 812a and 812c the display data for each of the three modules 812a-c. Module 812a may then read only the portion of the display data that is addressed to module 812a. That is, module 812a may read only the portion of the display data that is assigned to an address matching the address of module 812a. Similarly, module 812c may read only the portion of the display data that is addressed to module 812c. That is, module 812c may read only the portion of the display data that is assigned to an address matching the address of module 812*c*.

Module 812*a* may then transmit to module 812*b* the display data for each of the three modules 812*a-c*. Similarly, module 812*c* may then transmit to module 812*b* the display data for each of the three modules 812*a-c*. Module 812*b* may then read only the portion of the display data that is addressed to module 812*b*. That is, module 812*b* may read only the portion of the display data that is assigned to an address matching the address of module 812*b*.

Module 812*b* may then transmit to each of modules 812*a* and 812*c* the display data for each of the three modules 812*a-c*. Module 812*c* may then read only the portion of the display data that is addressed to module 812*c*. That is, module 812*c* may read only the portion of the display data that is assigned to an address matching the address of module 812*c*. Similarly, module 812*c* may then read only the portion of the display data that is addressed to module 812*c*. That is, module 812*c* may read only the portion of the display data that is assigned to an address matching the address of module 812*c*.

Modules 812*a* and 812*c* may each transmit the display data for each of the three modules 812*a-c* directly back to controller 818. Controller 818 may then treat the receipt of the display data for each of the three modules 812*a-c* as an acknowledgement that each of the three modules 812*a-c* also received the display data for each of the three modules 812*a-c*. However, in another embodiment, instead of transmitting the display data for each of the three modules 812*a-c*, one or both of modules 812*a*, 812*c* transmits only a short acknowledgement signal to controller 818 for the sake of efficiency.

Figure 8B:
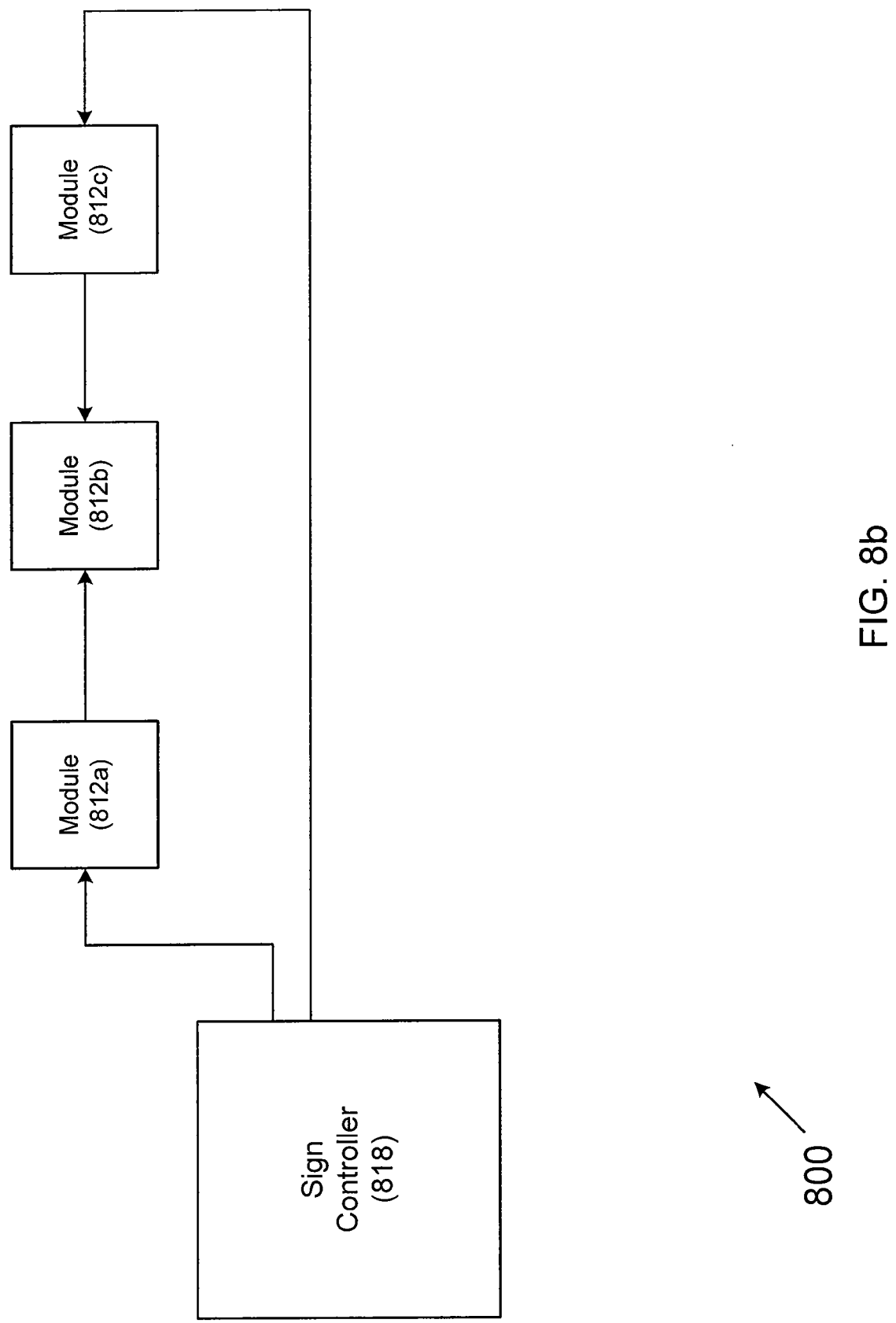
FIG. 8b is a block diagram of the sign controller and module connections of the electronic display arrangement of FIG. 8a illustrating the flow of display data with one of the modules malfunctioning.

In the event that one of modules 812*a-c* malfunctions and is unable to transmit display data, each of modules 812*a-c* may still receive the display data from one of the two directions, i.e., from either the clockwise direction or the counterclockwise direction. For the specific example of a malfunction in module 812*b*, FIG. 8*b* illustrates the flow of display data such that each of modules 812*a-c* still receives the display data. More particularly, if module 812*b* malfunctions and thus becomes unable to transmit the display data in either the clockwise or counterclockwise direction, then module 812*a* may still receive the display data in the clockwise direction, and module 812*c* may still receive the display data in the counterclockwise direction. If controller 818 does not receive the display data or an acknowledgement signal from modules 812*a*, 812*c* within a predetermined length of time after transmitting the display data to modules 812*a*, 812*c*, then sign controller 818 may assume that one of modules 812*a-c* has malfunctioned and is no longer capable of transmitting the display data. Further, if module 812*a* does not receive the display data in the counterclockwise direction from module 812*b* within a predetermined length of time after receiving the display data in the clockwise direction from controller 818, then module 812*a* may assume that one of modules 812*b-c* has malfunctioned and is no longer capable of transmitting the display data. Similarly, if module 812*c* does not receive the display data in the clockwise direction from module 812*b* within a predetermined length of time after receiving the display data in the counterclockwise direction from controller 818, then module 812*c* may assume that one of modules 812*a-b* has malfunctioned and is no longer capable of transmitting the display data.

As shown in FIG. 3*c*, module 812*a* may respond to not receiving the display data in the counterclockwise direction from module 812*b* by transmitting an error signal to controller 818 identifying module 812*a* as being a module that did not receive display data in both directions. In embodiments in which there are one or more intervening modules between module 812*a* and controller 818, such intervening modules may pass the error signal to controller 818 substantially unchanged. Similarly, module 812*c* may respond to not receiving the display data in the clockwise direction from module 812*b* by transmitting an error signal to controller 818 identifying module 812*c* as being a module that did not receive display data in both directions. In embodiments in which there are one or more intervening modules between module 812*c* and controller 818, such intervening modules may pass the error signal to controller 818 substantially unchanged.

Sign controller 818 may determine from the error signals received from modules 812*a* and 812*c* that module 812*b* is malfunctioning. Controller 818 may then electronically notify sign maintenance personnel that module 812*b* is in need of repair.

As schematically indicated in FIG. 8*a*, modules 812*a-c* may each be capable of transmitting the display data on a same communication port on which the module receives the display data. Alternatively, each of modules 812*a-c* may transmit the display data on a communication port that is different from the communication port on which the module receives the display data. For example, module 812*a* may receive display data in the clockwise direction on a same communication port on which module 812*a* transmits display data in the counterclockwise direction. Alternatively, module 812*a* may receive display data in the clockwise direction on a communication port that is different from the communication port on which module 812*a* transmits display data in the counterclockwise direction.

In the embodiments described above, the flow of display data may be in a horizontal direction across the electronic display from module to module, or in a vertical direction down the electronic display from module to module. However, in another embodiment of an electronic display arrangement 900 illustrated in FIG. 9, the flow of display data may be in opposite horizontal directions left and right across the electronic display from module to module as well as in opposite vertical directions up and down the electronic display from module to module. That is, the display data may enter the modules from above, from below, from the left, and from the right. Moreover, a single sign controller 918 provides display data for the entire grid or network of modules. Specifically, sign controller 918 may provide all of the display data for every one of the modules in the grid network (i.e., modules 912*a-c*, 914*a-c*, 916*a-c*) to each of modules 912*a-c*, 914*a*, 914*c*, and 916*a-c*. That is, each module may receive the display data for itself as well as for every other module in the grid network. Accordingly, regardless of how many modules malfunction, each of the still functioning modules may receive its display data as long as some path of other still functioning modules exists between controller 918 and the receiving module. Although each module is shown as receiving display data in each of four directions, it is also possible in another embodiment (not shown), for each module to receive display data in only three directions (e.g., from above or from below, but not both, and from left and right; or from left or right, but not both, and from above and below). Other features of arrangement 900 may be substantially similar to the features of other embodiments described above, and are not described specifically in association with arrangement 900 in order to avoid needless repetition.

Figure 9:
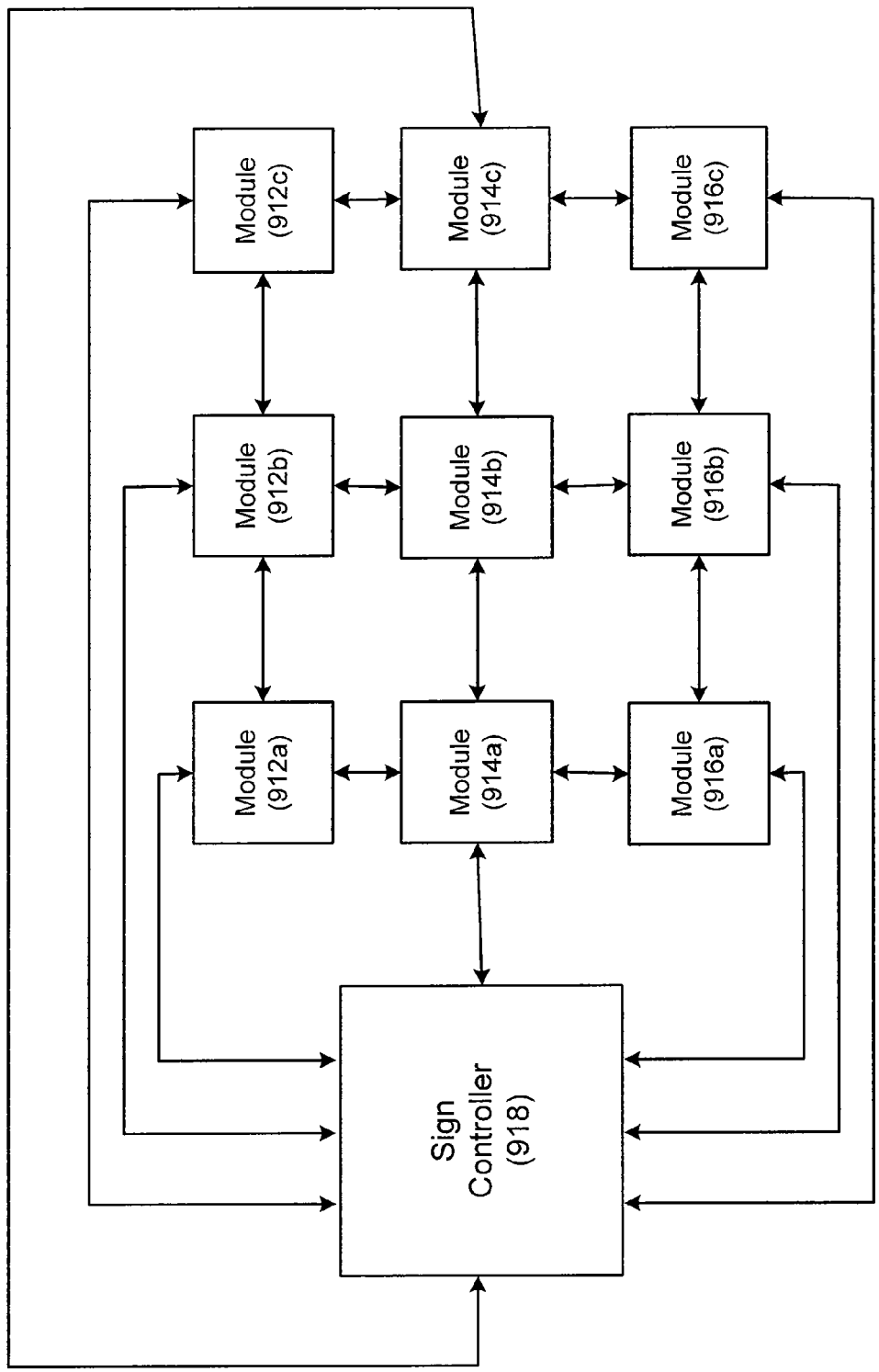
FIG. 9 is a block diagram of a sign controller and module connections of yet another embodiment of an electronic display arrangement of the present invention.

In a diagnostic mode of operation, each module 912*a-c*, 914*a-c*, 916*a-c* may transmit diagnostic information about itself back to sign controller 918 over the same channel that is used to receive data. The diagnostic mode may be initiated by sign controller 918. The direction in which the diagnostic data flows may be dependent upon which channel the module is actively listening to. Thus, diagnostic information may be transmitted by a module in any direction in which the module may receive display data. In the embodiment of FIG. 9, each of modules 912*a-c*, 914*a-c*, 916*a-c* may transmit diagnostic information about itself, or diagnostic information that the module receives from another controller, in the left, right, upward, or downward directions. In one embodiment, similarly to the transmission of display data, each module may transmit diagnostic information in each direction that it is possible to do so. Thus, in the event that one or more other modules are malfunctioning, the diagnostic information may still arrive at the controller via one or more paths of properly functioning modules. In one embodiment, if a module does not receive display data in each direction in which it is possible for the module to receive display data, then the module transmits an error signal in each direction in which it is possible to do so. The error signal may identify the reporting module as well as the neighboring module that failed to transmit display data to the reporting module, and/or the error signal may identify the direction from which the reporting module did not receive the display data. Each other module that receives the error signal may re-transmit the error signal in each direction in which it is possible to do so, which may maximize the probability that the error signal will reach the controller.

Figure 10:
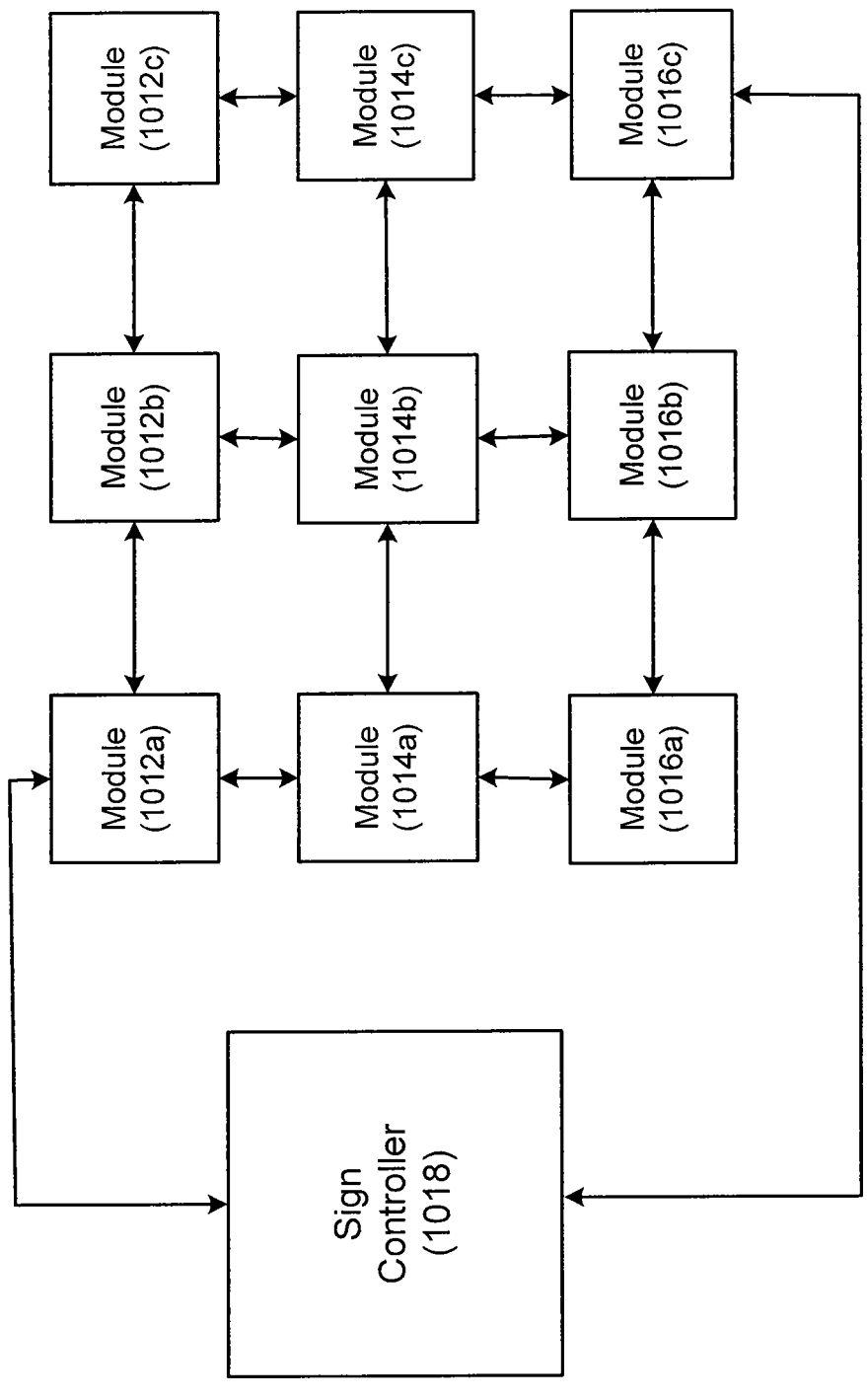
FIG. 10 is a block diagram of a sign controller and module connections of still another embodiment of an electronic display arrangement of the present invention.

In the embodiment of FIG. 9 described above, the sign controller is in direct bi-directional communication with each module that is at an end of a row or column. However, in another embodiment of an electronic display arrangement 1000 illustrated in FIG. 10, the sign controller is in direct bi-directional communication only with two modules that are on opposite corners of the rectangular matrix of modules. In this embodiment, the number of direct electrical connections from sign controller 1018 to the network of modules is reduced. Nevertheless, if one of the modules malfunctions, it is still possible for each of the other modules in the matrix to receive the display data from controller 1018. Other features of arrangement 1000 may be substantially similar to the features of arrangement 900, and are not described in detail herein in order to avoid needless repetition.

While this invention has been described as having an exemplary design, the present invention may be further modified within the spirit and scope of this disclosure. This application is therefore intended to cover any variations, uses, or adaptations of the invention using its general principles.

What is claimed is:

1. A method of operating an electronic display, comprising the steps of providing a plurality of modules electrically connected to each other in a network such that each module is at least indirectly connected to each other one of the modules, and at least one of the modules is directly connected to at least four other ones of the modules; directly electrically connecting a first one of the modules to a controller; directly electrically connecting a second one of the modules to the controller; transmitting display data from the controller to each of the first module and the second module; transmitting the display data from the first module to every other one of the modules via the network; transmitting the display data from the second module to every other one of the modules via the network; using each of the modules to control activation of a respective plurality of lighting elements dependent upon the received display data; and using the first module to transmit directly to the controller an acknowledgement that the first module received the display data via the second module, wherein the acknowledgment comprises the display data.

2. A method of operating an electronic display, comprising the steps of: providing a plurality of modules electrically connected to each other in a network such that each module is at least indirectly connected to each other one of the modules, and at least one of the modules is directly connected to at least three other ones of the modules; directly electrically connecting a first one of the modules to a controller; directly electrically connecting a second one of the modules to the controller; transmitting display data from the controller to each of the first module and the second module; transmitting the display data from the first module to every other one of the modules via the network; transmitting the display data from the second module to every other one of the modules via the network; using each of the modules to control activation of a respective plurality of lighting elements dependent upon the received display data; transmitting diagnostic information from one of the modules to each other said module that the one module is directly connected to; and transmitting the diagnostic information from each of the other said modules that received the diagnostic information to the controller.

3. The method of claim 2 comprising the further step of transmitting an error signal from one of the modules to the controller if the one module does not receive the display data from each direction in which it is possible for the one module to receive the display data.

4. The method of claim 2 wherein the diagnostic information is transmitted via the network from each of the other said modules that received the diagnostic information to the controller.

5. The method of claim 4 wherein the diagnostic information comprises a status of the one module, a status of a part of the one module, a failure mode of the one module, an identity of another module that failed to transmit display data to the one module, and/or a direction from which the one module did not receive display data.

6. The method of claim 2 wherein the modules are arranged in a matrix including a plurality of substantially vertical columns of the modules and a plurality of substantially horizontal rows of the modules.

7. The method of claim 6 wherein each of the modules directly transmits the display data to each horizontally adjacent said module and to each vertically adjacent said module.

* * * * *